(12) United States Patent
Kataoka et al.

(10) Patent No.: US 8,033,093 B2
(45) Date of Patent: Oct. 11, 2011

(54) GAS TURBINE APPARATUS

(76) Inventors: Tadashi Kataoka, Ohta-ku (JP);
Tadahiko Kishikawa, Ohta-ku (JP);
Teruyuki Nakajima, Ohta-ku (JP)

(*) Notice: Subject to any disclaimer, the term of this patent is extended or adjusted under 35 U.S.C. 154(b) by 948 days.

(21) Appl. No.: 11/872,921

(22) Filed: Oct. 16, 2007

(65) Prior Publication Data

US 2008/0173006 A1 Jul. 24, 2008

(30) Foreign Application Priority Data

Oct. 16, 2006 (JP) ................................ 2006-281269

(51) Int. Cl.
*F02G 1/00* (2006.01)
(52) U.S. Cl. .................................................... 60/39.511
(58) Field of Classification Search ................ 60/60.511
See application file for complete search history.

(56) References Cited

U.S. PATENT DOCUMENTS

| | | | |
|---|---|---|---|
| 3,320,749 A * | 5/1967 | Castle et al. ................. | 60/226.1 |
| 6,463,730 B1 * | 10/2002 | Keller et al. ................. | 60/39.24 |
| 6,832,470 B2 * | 12/2004 | Dewis ......................... | 60/39.511 |
| 6,901,759 B2 * | 6/2005 | Frutschi .......................... | 60/772 |
| 6,971,227 B2 * | 12/2005 | Dolak et al. ............... | 60/39.511 |
| 7,775,031 B2 * | 8/2010 | Wood .......................... | 60/39.511 |

* cited by examiner

*Primary Examiner* — Ehud Gartenberg
*Assistant Examiner* — Young Choi
(74) *Attorney, Agent, or Firm* — Waddey & Patterson, P.C.; Lucian Wayne Beavers

(57) ABSTRACT

A gas turbine apparatus is used in, for example, a power generation apparatus. The gas turbine apparatus according to the present invention includes a turbine, an air compressor rotatable integrally with the turbine, a recuperator for performing heat exchange between air compressed by the air compressor and an exhaust gas discharged from the turbine, a combustor for combusting a fuel mixed with the compressed air heated by the recuperator so as to produce a combustion gas, and an outer tube, an intermediate tube, and an inner tube which are coaxially arranged. An outer passage is formed between the outer tube and the intermediate tube, an intermediate passage is formed between the intermediate tube and the inner tube, and an inner passage is formed in the inner tube.

17 Claims, 7 Drawing Sheets

GAS TURBINE APPARATUS

BACKGROUND OF THE INVENTION

1. Field of the Invention

The present invention relates to a gas turbine apparatus, and more particularly to a gas turbine apparatus for use in a micro gas turbine power generation apparatus or the like.

2. Description of the Related Art

A conventionally-known gas turbine apparatus generally comprises an air compressor for compressing air, a combustor for combusting the air compressed by the air compressor, a turbine rotated by receiving a combustion gas generated in the combustor, and a recuperator for heating the compressed air to be supplied to the combustor using heat of an exhaust gas discharged from the turbine.

Applications of gas turbine apparatus of this type include a micro gas turbine power generation apparatus. This micro gas turbine power generation apparatus has a very small-sized turbine and a very small-sized generator coupled to the turbine. A combustion gas is supplied to the turbine to thereby rotate the generator at a high speed, e.g., about 100,000 revolutions per minute. Although the micro gas turbine power generation apparatus is very small in size, it can generate about, for example, 50 to 100 kW of electric power. Hence, the micro gas turbine power generation apparatus has recently received remarkable attention as one of geographically-distributed power sources.

Japanese laid-open patent publication No. 2003-322030 discloses a gas turbine apparatus having a triple pipe which forms three flow passages: a flow passage for providing fluid communication between an air compressor and a recuperator; a flow passage for providing fluid communication between the recuperator and a combustor; and a flow passage for providing fluid communication between a turbine and the recuperator. FIG. 7 shows a perspective view of the triple pipe structure disclosed in the above-mentioned Japanese patent publication. In FIG. 7, air is compressed by an air compressor and is introduced into a recuperator 115 through an outer passage 124 and a connection pipe 127. The compressed air, heated by the recuperator 115, is then introduced into an intermediate passage 125 through compressed-air outlets 129 and introduction pipes 128 each having a semicircular cross section. An exhaust gas is discharged from a turbine, and is introduced into the recuperator 115 through an inner passage 126.

As shown in FIG. 7, the compressed air, flowing through the outer passage 124, strikes a front surface 115a of the recuperator 115, whereby the compressed air changes its direction and flows into the connection pipe 127. However, the introduction pipes 128 extend across the outer passage 124, and hence part of the compressed air is intercepted by the introduction pipes 128, which disturb smooth flow of the compressed air from the outer passage 124 toward the connection pipe 127. As a result, the compressed air is placed in contact with the high-temperature introduction pipes 128 and the high-temperature front surface 115a of the recuperator 115 for a long period of time, and a temperature of the compressed air is thus increased. Further, upon striking of the compressed air against the front surface 115a, the compressed air would be heated by this high-temperature front surface 115a.

Such an increase in temperature of the compressed air results in a decrease in efficiency of heat exchange at the recuperator 115 into which the compressed air flows subsequently. More specifically, in the recuperator 115 that serves as a heat exchanger, the lower the temperature of the compressed air to be introduced into the recuperator 115, the greater an amount of heat transferred from the exhaust gas to the compressed air. Accordingly, the increase in temperature of the compressed air that is to be introduced into the recuperator 115 leads to the decrease in efficiency of the heat exchange, resulting in a lowered amount of exhaust-heat recovery at the recuperator 115.

SUMMARY OF THE INVENTION

The present invention has been made in view of the above drawbacks. It is therefore an object of the present invention to provide a gas turbine apparatus with an improved efficiency of heat exchange at a recuperator.

One aspect of the present invention for achieving the above object is to provide a gas turbine apparatus comprising a turbine, an air compressor rotatable integrally with the turbine, a recuperator for performing heat exchange between air compressed by the air compressor and an exhaust gas discharged from the turbine, a combustor for combusting a fuel mixed with the compressed air heated by the recuperator so as to produce a combustion gas which is supplied to the turbine to thereby rotate the turbine, and an outer tube, an intermediate tube, and an inner tube which are coaxially arranged. An outer passage for the compressed air produced by the air compressor is formed between the outer tube and the intermediate tube, an intermediate passage for the compressed air heated by the recuperator is formed between the intermediate tube and the inner tube, and an inner passage for delivering an exhaust gas from the turbine to the recuperator is formed in the inner tube. A connection passage is provided for delivering the compressed air from the outer passage to the recuperator. An introduction pipe extending through the outer tube to the intermediate passage is provided for delivering the compressed air heated by the recuperator to the intermediate passage. An annular guide plate for guiding the compressed air to the connection passage is provided in the outer passage in a position upstream of the introduction passage.

In a preferred aspect of the present invention, the guide plate is disposed so as to cover the introduction pipe and so as to plug the outer passage.

In a preferred aspect of the present invention, the exhaust gas is flows out from the recuperator in substantially the same direction as that of the exhaust gas flowing into the recuperator.

In a preferred aspect of the present invention, the exhaust gas flows out from the recuperator in a direction substantially perpendicular to that of the exhaust gas flowing into the recuperator.

In a preferred aspect of the present invention, the gas turbine apparatus further comprises at least one through-hole formed in the intermediate tube for providing fluid communication between the outer passage and the intermediate passage, at least one valve for closing the at least one through-hole, and at least one drive mechanism for driving the at least one valve. The at least one drive mechanism is provided outside the outer tube.

In a preferred aspect of the present invention, the at least one drive mechanism is operable to open the at least one valve during start-up operation or shut-down operation of the gas turbine apparatus.

According to the present invention, the guide plate, which is provided in the outer passage, can prevent the compressed air from being trapped by the introduction passage. Therefore, the compressed air can form smooth flow from the outer passage to the connection passage. As a result, the increase in temperature of the compressed air to be supplied into the recuperator is suppressed, and efficiency of the heat exchange at the recuperator can be improved.

DETAILED DESCRIPTION OF THE PREFERRED EMBODIMENTS

A gas turbine apparatus according to the present invention will be described below with reference to FIG. 1 through FIG. 6. Examples of a gas turbine power generation system, which will be described below, include a micro gas turbine power generation apparatus that generates power using a very small-sized turbine.

Figure 1:
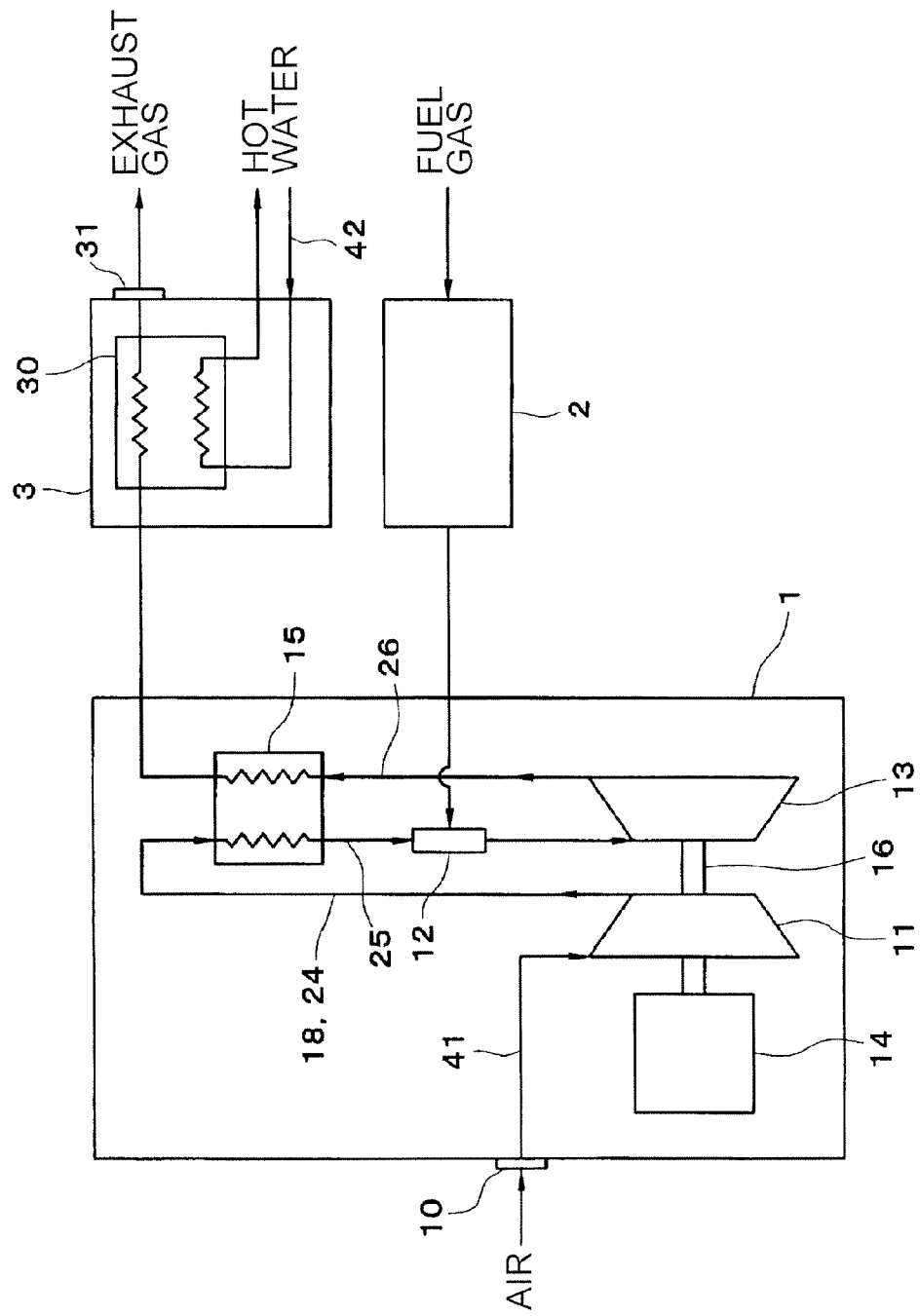
FIG. 1 is a diagram showing an overall view of a gas turbine power generation system using a gas turbine apparatus according to a first embodiment of the present invention.

FIG. 1 is a diagram showing an overall view of a gas turbine power generation system using a gas turbine apparatus according to a first embodiment of the present invention. As shown in FIG. 1, the gas turbine power generation system comprises a gas turbine apparatus 1 which generates power by combusting a mixture of a compressed air and a fuel gas, a gas compressor 2 for supplying the fuel gas, e.g., a natural gas or a liquefied petroleum gas (LPG), to the gas turbine apparatus 1, and a hot-water boiler 3 for recovering exhaust heat from an exhaust gas discharged from the gas turbine apparatus 1.

Figure 2:
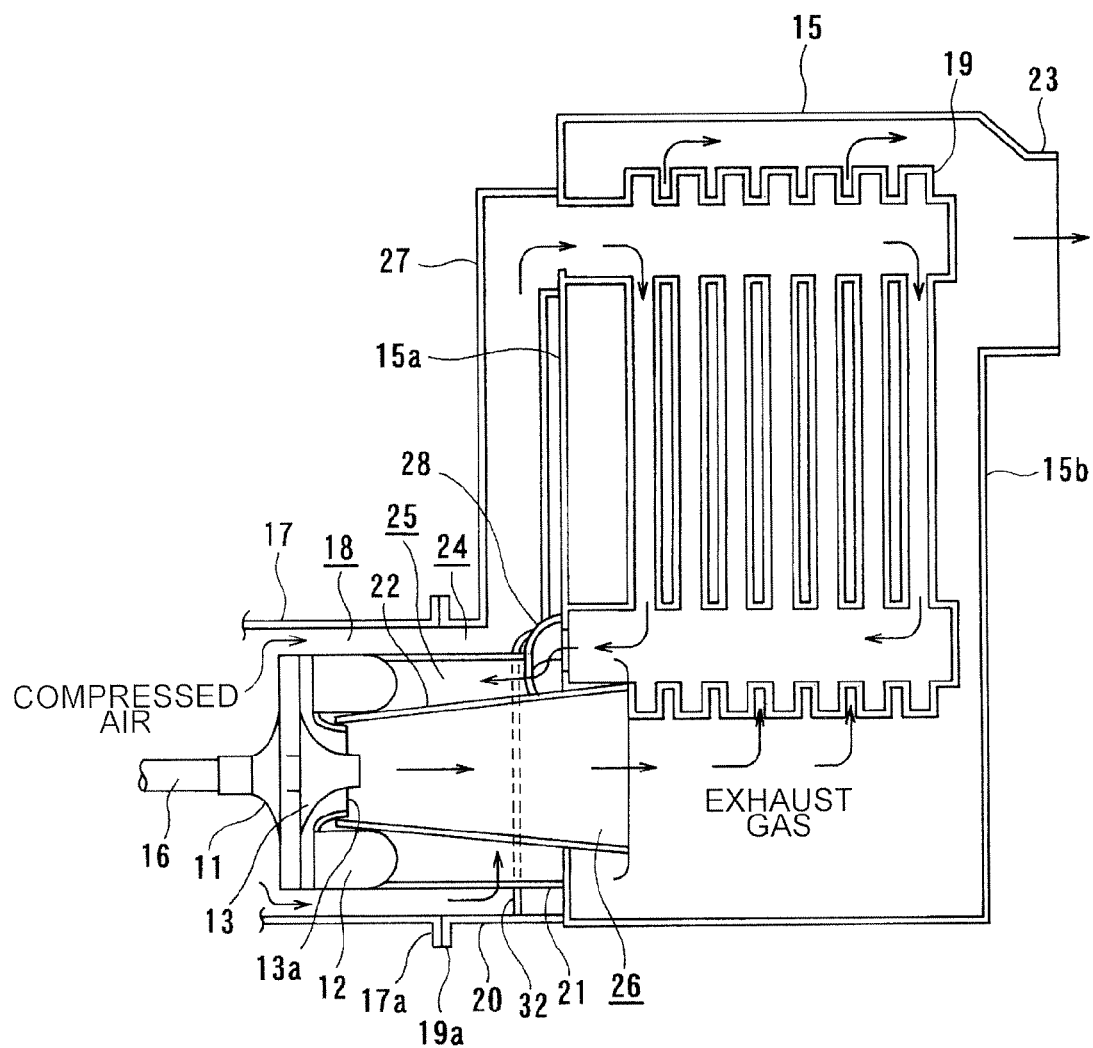
FIG. 2 is a cross sectional view schematically showing the gas turbine apparatus in FIG. 1.

FIG. 2 is a cross sectional view schematically showing the gas turbine apparatus 1 in FIG. 1. As shown in FIG. 1 and FIG. 2, the gas turbine apparatus 1 comprises an air compressor 11 for compressing air sucked through an air-inlet port 10, an annular combustor 12 for combusting a mixture of the air compressed by the air compressor 11 and the fuel gas supplied from above-mentioned gas compressor 2, a turbine 13 having rotary vanes and configured to rotate at a high speed by receiving a combustion gas produced in the annular combustor 12, a generator 14 for generating power by the high-speed rotation of the turbine 13, and a recuperator 15 for heating the compressed air, to be supplied to the annular combustor 12, using heat of the exhaust gas discharged from the turbine 13. The recuperator 15 has two plate-fin heat exchangers 19 therein (only one heat exchanger 19 is shown in FIG. 2). Each of the heat exchangers 19 has a compressed air passage (a low-temperature medium passage) and an exhaust gas passage (a high-temperature medium passage), each formed by plate fins.

As shown in FIG. 2, the air compressor 11, the turbine 13, and the generator 14 (see FIG. 1) are housed in a casing 17, and are aligned with each other on a rotational shaft 16 which is rotatably supported by non-illustrated bearings. A passage 18 is formed at a periphery of the casing 17, so that the compressed air, which was discharged from the air compressor 11, flows through this passage 18. The annular combustor 12 is located between the passage 18 and a gas outlet 13a of the turbine 13, and is shaped so as to surround the turbine 13. The generator 14 is coupled to an end of the rotational shaft 16. The turbine 13, the air compressor 11, and the generator 14 rotate integrally via the rotational shaft 16.

The casing 17 is coupled to the recuperator 15 via flanges 17a and 19a. This recuperator 15 performs heat exchange between the compressed air to be supplied to the annular combustor 12 and the exhaust gas discharged from the turbine 13. An outer tube 20, an intermediate tube 21, and an inner tube 22 are provided on a lower portion of a front surface 15a of the recuperator 15. The outer tube 20 is coupled to the casing 17, the intermediate tube 21 is arranged inwardly of the outer tube 20, and the inner tube 22 is arranged inwardly of the intermediate tube 21. The outer tube 20, the intermediate tube 21, and the inner tube 22 are coaxially arranged. An exhaust-gas outlet 23 is formed on an upper portion of a rear surface 15b of the recuperator 15, so that the exhaust gas, which flowed through the heat exchanger 19, is discharged to the exterior of the recuperator 15. An outer passage 24 is formed between the outer tube 20 and the intermediate tube 21, an intermediate passage 25 is formed between the intermediate tube 21 and the inner tube 22, and an inner passage 26 is formed in the inner tube 22. Thus, the outer tube 20, the intermediate tube 21, and the inner tube 22 constitute a triple pipe structure.

A connection pipe (connection passage) 27 is provided outside the recuperator 15 in a position slightly away from the front surface 15a. One end of the connection pipe 27 is connected to the outer tube 20 by welding. The connection pipe 27 and the outer passage 24 communicate with each other. Another end of the connection pipe 27 is connected to a compressed-air inlet of the recuperator 15.

Figure 3:
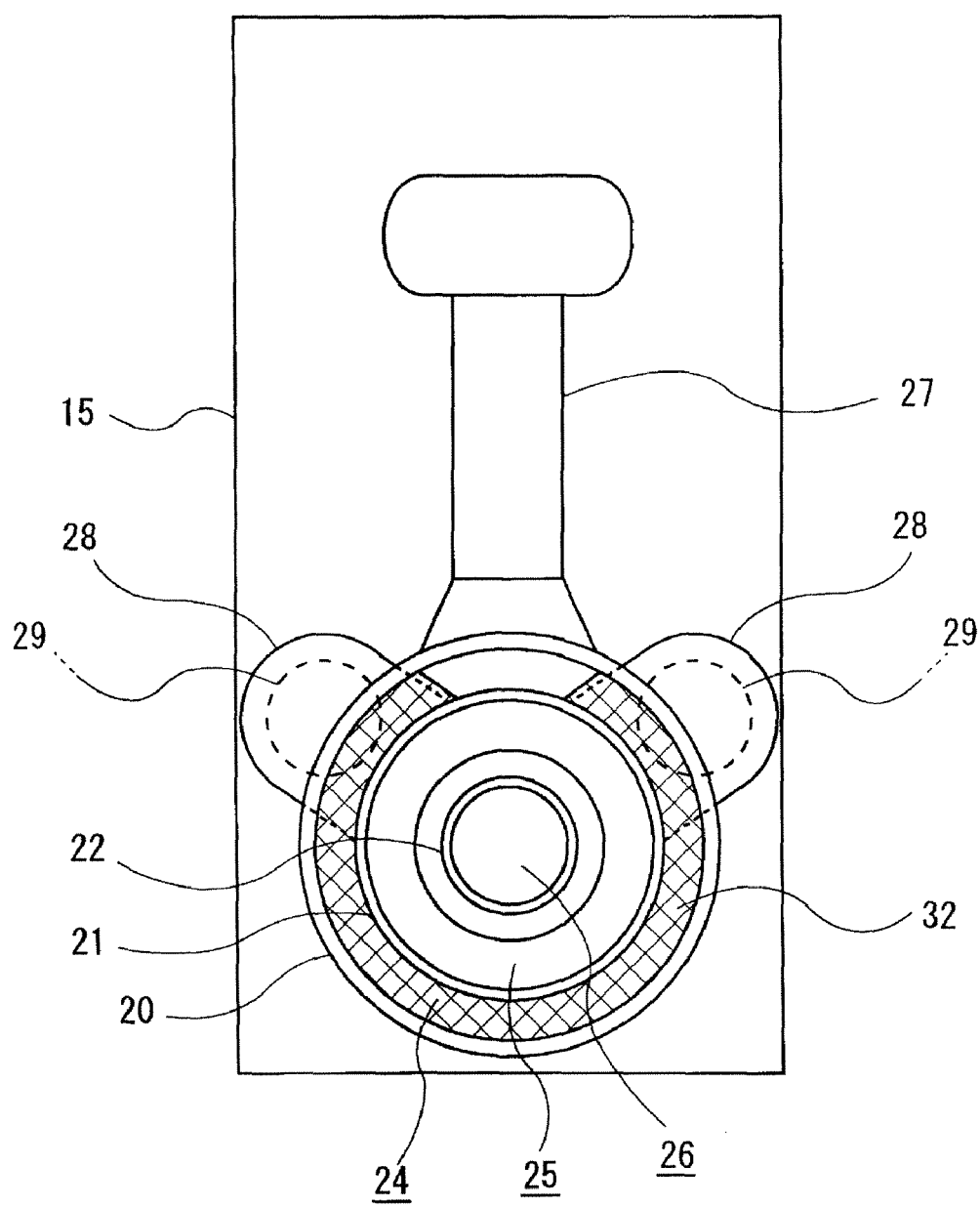
FIG. 3 is a view showing a triple pipe comprising an outer tube, an intermediate tube, and an inner tube each viewed from an axial direction.
Figure 4:
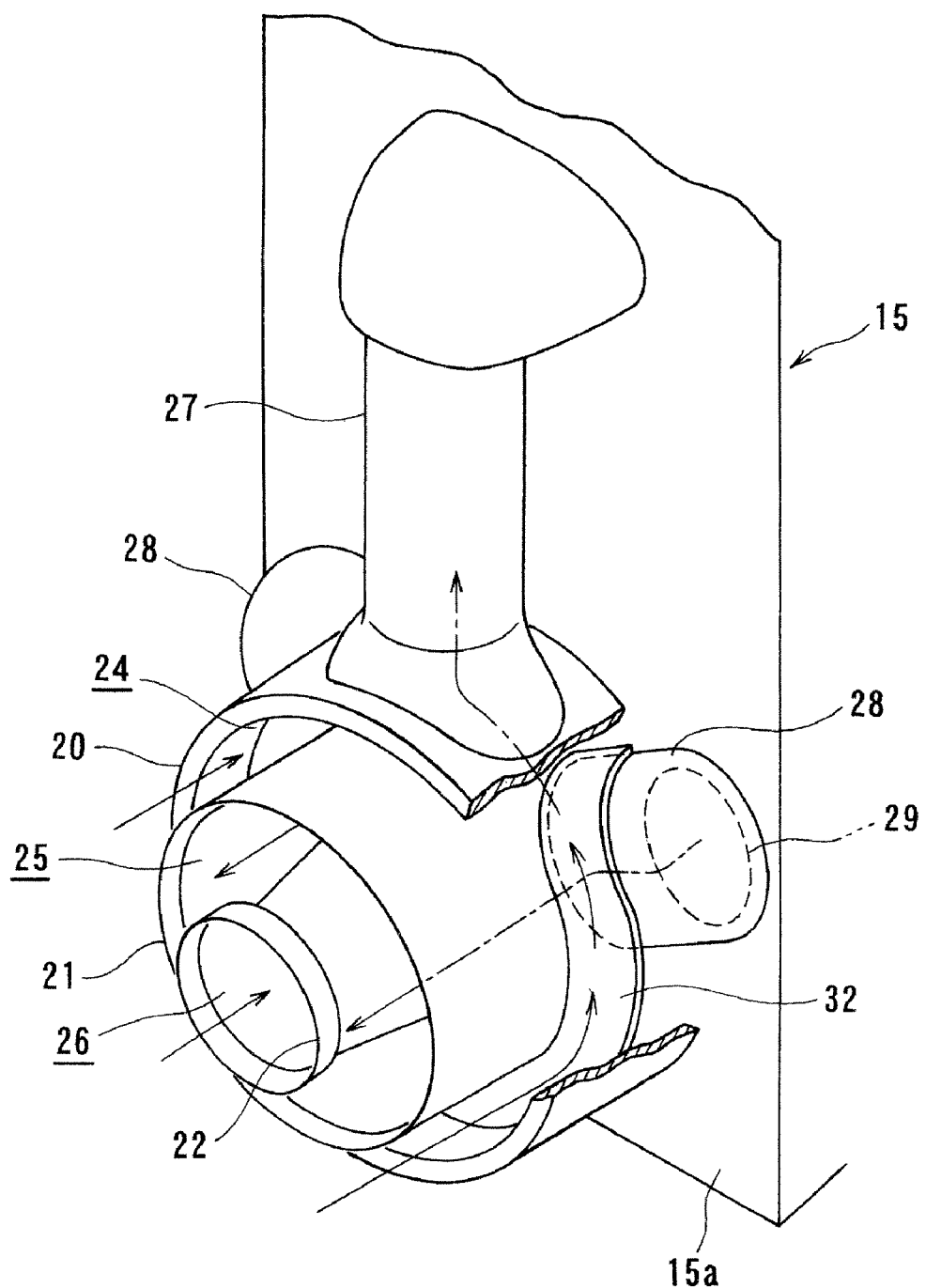
FIG. 4 is a perspective view of the triple pipe according to the first embodiment.

FIG. 3 is a view showing the triple pipe comprising the outer tube 20, the intermediate tube 21, and the inner tube 22 each viewed from an axial direction thereof. FIG. 4 is a perspective view of the triple pipe according to the first embodiment. As shown in FIG. 3, the recuperator 15 has two compressed-air outlets (i.e., outlets for the heated compressed air) 29. These compressed-air outlets 29 are coupled respectively to introduction pipes (introduction passages) 28 each having a semicircular cross section. As shown in FIG. 3 and FIG. 4, the introduction pipes 28 extend through the outer tube 20 and across the outer passage 24 to communicate with the intermediate passage 25. Ends of the introduction pipes 28 are fixed to the intermediate tube 21 by welding. The inner passage 26 communicates with the interior of the recuperator 15. As shown in FIG. 2, the casing 17 is coupled to the triple pipe, so that the outer passage 24 communicates with the passage 18 of the casing 17, the intermediate passage 25 communicates with the annular combustor 12 and the inner passage 26 communicates with the gas outlet 13a of the turbine 13.

As shown in FIG. 2 through FIG. 4, an annular plug plate (guide plate) 32 is provided in the outer passage 24. In FIG. 3, a member that is illustrated by a netlike pattern is the plug plate 32. This plug plate 32 is disposed so as to cover the two introduction pipes 28 extending through the outer passage 24, and is located upstream of the introduction pipes 28 with respect to a flow direction of the compressed air. Further, the plug plate 32 is disposed so as to plug most of the outer passage 24 in a position upstream of the introduction pipes 28. The plug plate 32 may plug all of the outer passage 24. With this arrangement, the compressed air from the air compressor 11 is guided by the plug plate 32 to flow into the connection pipe 27, which is connected to an upper portion of the outer tube 20, with little contact with the high-temperature introduction pipes 28 and the high-temperature front surface 15a of the recuperator 15.

According to the above-mentioned structure, air is introduced through the air-inlet port 10 (see FIG. 1) into the air compressor 11 via a pipe 41. The air is compressed by the air compressor 11 to thereby form the compressed air. The compressed air from the air compressor 11 flows through the passage 18, the outer passage 24, and the connection pipe 27 into the heat exchanger 19 of the recuperator 15. While flowing through the heat exchanger 19 of the recuperator 15, the compressed air is heated by the exhaust gas flowing along an outer surface of the heat exchanger 19. The compressed air, which has been heated by the recuperator 15, flows through the compressed-air outlets 29, the introduction pipes 28, and the intermediate passage 25 into the annular combustor 12, where the compressed air is mixed with the fuel gas supplied from the gas compressor 2 (see FIG. 1). As a result, a mixture of the compressed air and the fuel gas (i.e., air-fuel mixture) is produced in the annular combustor 12. This air-fuel mixture is combusted in the annular combustor 12, whereby a high-temperature high-pressure combustion gas is produced.

The turbine 13 receives the combustion gas produced in the annular combustor 12 to thereby rotate at a high speed. The generator 14 and the air compressor 11 are rotated by the high-speed rotation of the turbine 13. The generator 14 generates an alternating current, which is adjusted by a non-illustrated direct-current converter, a booster, an inverter, and the like so that the alternating current generated can be used as a commercial alternating current. This commercial alternating current is output to the exterior of the gas turbine apparatus.

The exhaust gas, which was discharged from the turbine 13, flows through the inner passage 26 into the recuperator 15. This exhaust gas, flowing through the recuperator 15, heats the compressed air flowing through the heat exchanger 19. The exhaust gas is discharged from the recuperator 15 through the exhaust-gas outlet 23 and is then supplied to the hot-water boiler 3.

As shown in FIG. 1, the hot-water boiler 3 has an exhaust-heat-recovery heat exchanger 30 for performing heat exchange between the exhaust gas from the turbine 13 and hot water. Specifically, the hot water flowing through a hot-water pipe 42 is heated by the exhaust gas from the turbine 13, whereby exhaust heat is recovered. The exhaust gas, which has been used in the heat exchange with the hot water in the exhaust-heat-recovery heat exchanger 30, is discharged through an exhaust port 31 of the hot-water boiler 3 to the exterior of the gas turbine power generation system.

As described above, because the passages 24, 25 and 26 are formed by the triple pipe structure between the recuperator 15 and the turbine 13, plural pipes are not required. Hence, a simple structure can be achieved. As a result, the number of components can be reduced, and a cost can be reduced. Furthermore, because the number of flanges and heat insulting materials to be attached to pipes can be reduced, the number of components can be further reduced, and hence the cost can be further reduced.

Furthermore, the guide plate 32 provided in the outer passage 24 can prevent the compressed air from being trapped by the introduction pipes 28. Therefore, the compressed air can form smooth flow from the outer passage 24 to the connection pipe 27. As a result, the increase in temperature of the compressed air to be supplied into the recuperator 15 is suppressed, and therefore efficiency of the heat exchange at the recuperator 15 can be improved.

Pressure of the air compressed by the air compressor 11 is about 0.4 MPa. However, this compressed air is subjected to pressure loss to some degree by the fins of the heat exchanger 19. As a result, the pressure of the compressed air is reduced to slightly less than 0.4 MPa. On the other hand, pressure of the exhaust gas from the turbine 13 is about 0.105 MPa, which is close to atmospheric pressure. Comparing pressure in the outer passage 24 where the air compressed by the air compressor 11 flows, pressure in the intermediate passage 25 where the compressed air heated by the recuperator 15 flows, and pressure in the inner passage 26 where the exhaust gas from the turbine 13 flows, the highest pressure is the pressure in the outer passage 24, followed by the pressure in the intermediate passage 25. The pressure in the inner passage 26 is the lowest. Therefore, only providing of sufficient seal of the outermost passage (i.e., the outer passage 24) can prevent the air or exhaust gas in inward passages (i.e., the intermediate passage 25 and the inner passage 26) from escaping to the outside. The triple pipe structure can simplify sealing structures of the apparatus as a whole.

A temperature of the air compressed by the air compressor 11 is about 200° C. However, this compressed air is heated in the recuperator 15 to about 600° C. On the other hand, a temperature of the exhaust gas from the turbine 13 is about 650° C. Comparing the temperature of the compressed air flowing in the outer passage 24, the temperature of the compressed air flowing in the intermediate passage 25, and the temperature of the exhaust gas flowing in the inner passage 26, the lowest temperature is the temperature of the compressed air flowing in the outer passage 24, followed by the temperature of the compressed air flowing in the intermediate passage 25. The temperature of the exhaust gas flowing in the inner passage 26 is the highest. In this embodiment, because the outer passage 24, the intermediate passage 25, and the inner passage 26 are formed by the triple pipe structure, the air or exhaust gas with a high temperature flows through inward passages (i.e., the intermediate passage 25 and the inner passage 26) each having a small surface area. Therefore, this structure is advantageous in preventing heat dissipation to the outside. Hence, heat loss due to the heat dissipation can be suppressed. Furthermore, because the outer tube 20, which is the outermost tube, has a relatively low temperature, thermal expansion of the outer tube 20 is relatively low. Therefore, good sealing between the outer tube 20 and other members (e.g., the connection pipe 27 and the recuperator 15) fixed to the outer tube 20 can be maintained.

As shown in FIG. 2, in the recuperator 15, the exhaust gas flows in a direction substantially perpendicular to the flow direction of the exhaust gas flowing into the recuperator 15, and then flows out through the exhaust-gas outlet 23 in substantially the same direction as that of the exhaust gas flowing into the recuperator 15. This configuration of the recuperator 15 can simplify a flow path of the exhaust gas. Therefore, ventilation loss of the exhaust gas can be reduced, and back pressure of the turbine 13 can be reduced. As a result, power efficiency of the gas turbine apparatus can be improved.

Figure 5:
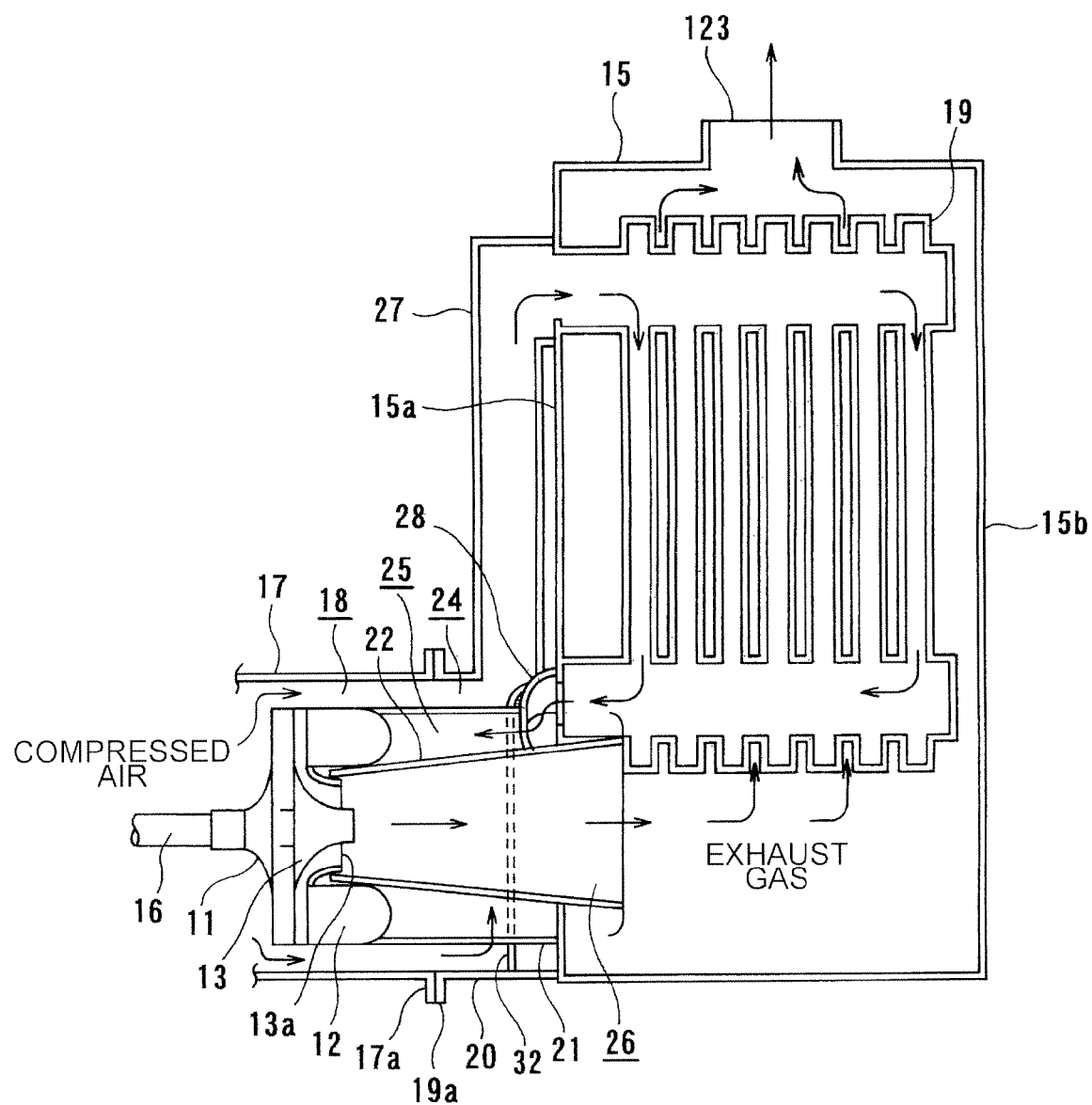
FIG. 5 is a cross sectional view schematically showing a gas turbine apparatus according to a second embodiment of the present invention.

FIG. 5 is a cross sectional view schematically showing a gas turbine apparatus according to a second embodiment of the present invention. In this embodiment, an exhaust-gas outlet 123 is provided on a top portion of the recuperator 15, so that the exhaust gas flows out through the exhaust-gas outlet 123 in a direction substantially perpendicular to the flow direction of the exhaust gas flowing into the recuperator 15. Other structures of this embodiment are identical to those of the first embodiment described above. In this embodiment, because the exhaust gas flows through and out of the recuperator 15 without changing its flowing direction, ventilation loss of the exhaust gas can be further reduced. As a result, power efficiency of the gas turbine apparatus can be further improved. Furthermore, this embodiment is advantageous when using the exhaust-heat-recovery heat exchanger 30 in the hot-water boiler 3 coupled downstream of the gas turbine apparatus. Specifically, because the exhaust-gas outlet 123 is provided on the top portion of the recuperator 15, the exhaust-heat-recovery heat exchanger 30 can be coupled in series to the recuperator 15. As a result, ventilation loss due to coupling can be reduced.

Figure 6:
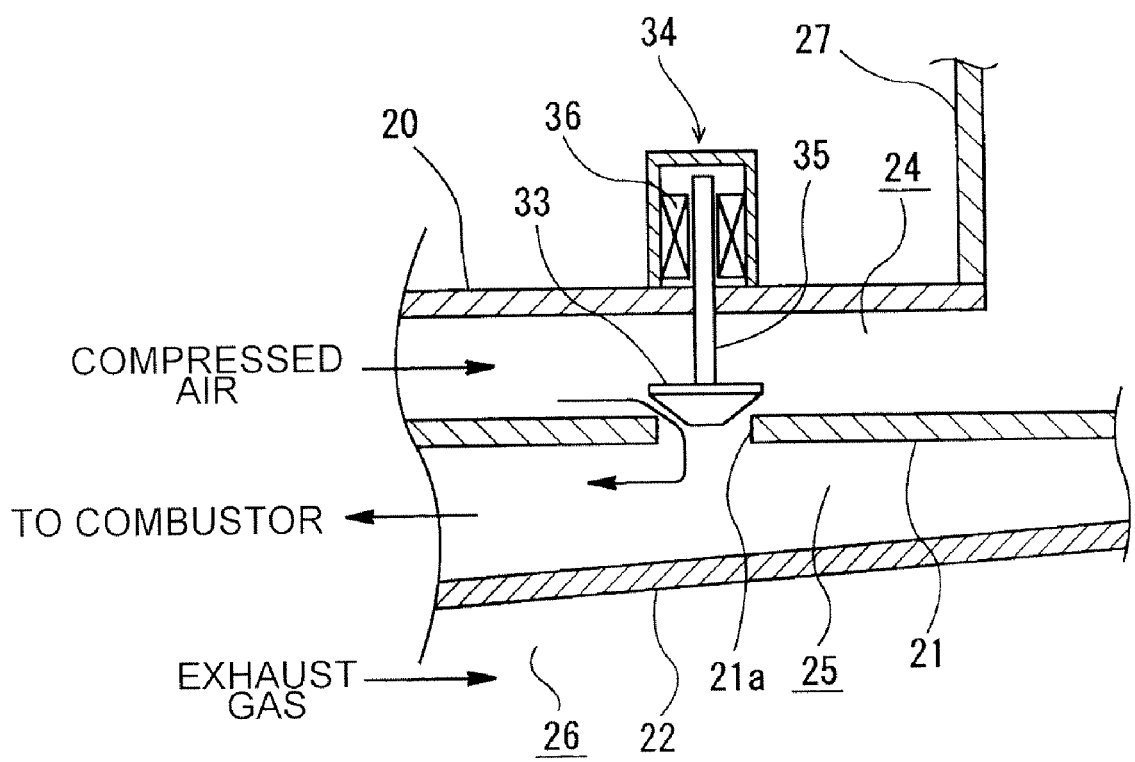
FIG. 6 is a cross sectional view schematically showing part of a gas turbine apparatus according to a third embodiment of the present invention.
Figure 7:
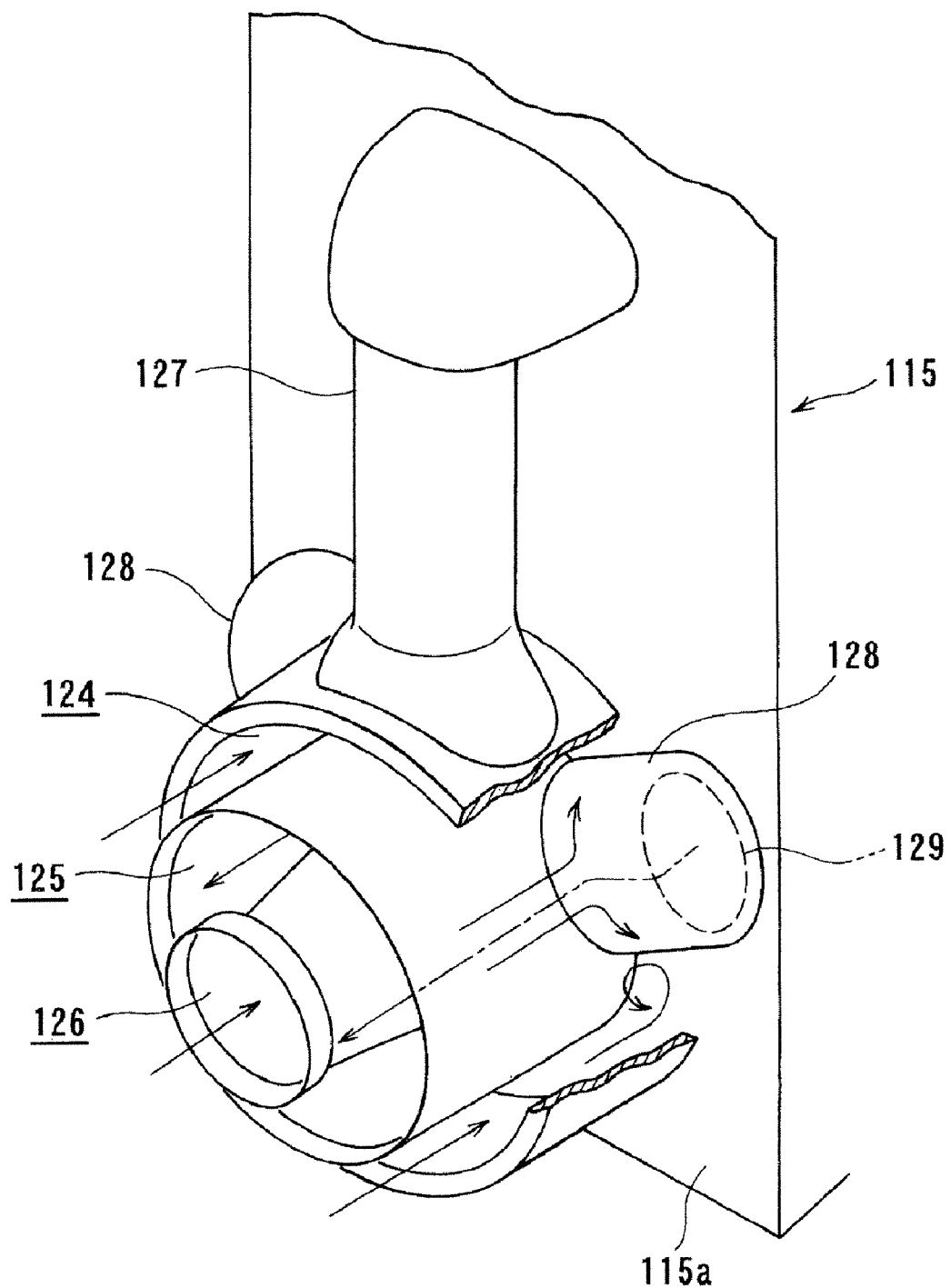
FIG. 7 is a perspective view showing a conventional tripe pipe structure.

FIG. 6 is a cross sectional view schematically showing part of a gas turbine apparatus according to a third embodiment of the present invention. Structures of this embodiment, which will not be described, are identical to those of the first or second embodiment. As shown in FIG. 6, the intermediate tube 21 has plural through-holes 21a which are equally spaced in a circumferential direction of the intermediate tube 21. Plural valves 33 are provided for closing these through-holes 21a. Further, drive mechanisms 34 for driving the valves 33 are provided on an outer surface of the outer tube 20. Each of the drive mechanisms 34 comprises a drive shaft 35 coupled to the valve 33, and an actuator (electromagnet) 36 for driving the drive shaft 35. When the valves 33 are opened by the drive mechanisms 34, the compressed air from the air compressor 11 is led from the outer passage 24 to the intermediate passage 25 through the through-holes 21a, so that the recuperator 15 is bypassed.

Bypassing of the recuperator 15 is performed mainly for the following two purposes. The first purpose is to shorten a start-up time and a shut-down time of the gas turbine apparatus. Since the recuperator 15 has a large heat capacity, if the temperature of the recuperator 15 is low, a long period of time is required for sufficiently heating the compressed air. Therefore, if the gas turbine apparatus is started when the temperature of the recuperator 15 is low, a long start-up time is required. Similarly, once the recuperator 15 is heated to a high temperature, the temperature of the compressed air supplied from the recuperator 15 to the annular combustor 12 is maintained at a high temperature for a while after the gas turbine apparatus starts its shut-down operation. Therefore, supply of the compressed air to the recuperator 15 would lead to a long shut-down time. For this reason, by bypassing the recuperator 15 during the start-up operation and the shut-down operation of the gas turbine apparatus, the start-up time and the shut-down time can be shortened.

The second purpose is to increase an amount of exhaust-heat recovery at the hot-water boiler (exhaust-heat recovery apparatus) 3. Specifically, by bypassing the recuperator 15 during a normal operation, an amount of exhaust-heat recovery at the recuperator 15 is lowered. As a result, the temperature of the exhaust gas discharged from the recuperator 15 is increased. Therefore, the amount of exhaust-heat recovery at the hot-water boiler (exhaust-heat recovery apparatus) 3 is increased, and an amount of hot water or steam produced in the hot-water boiler 3 can be increased. In this manner, by bypassing the recuperator 15 as needed during the normal operation, a ratio of output heat to output power can be changed. In this embodiment, opening degree of the valves 33 and the number of valves 33 to be opened can be regulated so as to control the amount of the compressed air to be bypassed.

In this embodiment, the three passages 24, 25 and 26 are defined by the coaxially-arranged three tubes 20, 21 and 22. Hence, by simply forming the through-holes 21a in the intermediate tube 21, fluid communication between the outer passage 24 and the intermediate passage 25 can be provided. Therefore, structures of the valves 33 and the drive mechanisms 34 can be simplified, and arrangement of the valves 33 and the drive mechanisms 34 can be easily designed.

Although certain preferred embodiments of the present invention have been shown and described in detail, it should be understood that the present invention is not limited to the above embodiments and that various changes and modifications may be made without departing from the scope of the technical concept of the present invention.

What is claimed is:

1. A gas turbine apparatus, comprising:
   a turbine;
   an air compressor rotatable integrally with said turbine;
   a recuperator for performing heat exchange between air compressed by said air compressor and an exhaust gas discharged from said turbine;
   a combustor for combusting a fuel mixed with the compressed air heated by said recuperator so as to produce a combustion gas which is supplied to said turbine to thereby rotate said turbine; and
   an outer tube, an intermediate tube, and an inner tube which are coaxially arranged,
   wherein an outer passage for the compressed air produced by said air compressor is formed between said outer tube and said intermediate tube,
   an intermediate passage for the compressed air heated by said recuperator is formed between said intermediate tube and said inner tube,
   an inner passage for delivering an exhaust gas from said turbine to said recuperator is formed in said inner tube,
   a connection passage is provided for delivering the compressed air from said outer passage to said recuperator;
   an introduction pipe extending through said outer tube to said intermediate passage is provided for delivering the compressed air heated by said recuperator to said intermediate passage, and
   an annular guide plate for guiding the compressed air to said connection passage is provided in said outer passage in a position upstream of said introduction pipe.

2. The apparatus according to claim 1, wherein said guide plate is disposed so as to cover said introduction pipe and so as to plug said outer passage.

3. The apparatus according to claim 1, wherein the exhaust gas flows out from said recuperator in substantially the same direction as that of the exhaust gas flowing into said recuperator.

4. The apparatus according to claim 1, wherein the exhaust gas flows out from said recuperator in a direction substantially perpendicular to that of the exhaust gas flowing into said recuperator.

5. The apparatus according to claim 1, further comprising:
   at least one through-hole formed in said intermediate tube for providing fluid communication between said outer passage and said intermediate passage;
   at least one valve for closing said at least one through-hole; and
   at least one drive mechanism for driving said at least one valve, said at least one drive mechanism being provided outside said outer tube.

6. The apparatus according to claim 5, wherein said at least one drive mechanism is operable to open said at least one valve during start-up operation or shut-down operation of said gas turbine apparatus.

7. The apparatus according to claim 1, wherein the introduction pipe extends radially through said outer tube.

8. The apparatus according to claim 1, wherein the introduction pipe extends radially through said outer passage.

9. The apparatus according to claim 1, wherein the guide plate is configured to prevent the compressed air in the outer passage from contacting the introduction pipe.

10. A gas turbine apparatus, comprising:
a turbine;
an air compressor rotatable integrally with said turbine;
a recuperator configured to perform heat exchange between air compressed by said air compressor and an exhaust gas discharged from said turbine;
a combustor configured to combust a fuel mixed with the compressed air heated by said recuperator so as to produce a combustion gas which is supplied to said turbine to thereby rotate said turbine; and
an outer tube, an intermediate tube, and an inner tube which are coaxially arranged, wherein an outer passage for the compressed air produced by said air compressor is formed between said outer tube and said intermediate tube, an intermediate passage for the compressed air heated by said recuperator is formed between said intermediate tube and said inner tube, and an inner passage for delivering an exhaust gas from said turbine to said recuperator is formed in said inner tube;
a connection passage configured to deliver the compressed air from said outer passage to said recuperator;
an introduction passage extending through said outer tube and through said outer passage to said intermediate passage, the introduction passage configured to deliver the compressed air heated by said recuperator to said intermediate passage; and
a guide plate provided in said outer passage in a position upstream of said introduction passage, the guide plate configured to guide the compressed air from the outer passage into the connection passage so that heat exchange is reduced between compressed air flowing into the connection passage and heated compressed air flowing through the introduction passage.

11. The apparatus according to claim 10, wherein the introduction passage extends radially through said outer tube and through said outer passage.

12. The apparatus according to claim 10, wherein said guide plate is disposed so as to cover said introduction passage and so as to plug said outer passage.

13. The apparatus according to claim 10, wherein the exhaust gas flows out from said recuperator in substantially the same direction as that of the exhaust gas flowing into said recuperator.

14. The apparatus according to claim 10, wherein the exhaust gas flows out from said recuperator in a direction substantially perpendicular to that of the exhaust gas flowing into said recuperator.

15. The apparatus according to claim 10, further comprising:
at least one through-hole formed in said intermediate tube for providing fluid communication between said outer passage and said intermediate passage;
at least one valve for closing said at least one through-hole; and
at least one drive mechanism for driving said at least one valve, said at least one drive mechanism being provided outside said outer tube.

16. The apparatus according to claim 15, wherein said at least one drive mechanism is operable to open said at least one valve during start-up operation or shut-down operation of said gas turbine apparatus.

17. The apparatus according to claim 10, wherein the guide plate is configured to prevent the compressed air in the outer passage from contacting the introduction passage.

* * * * *